United States Patent [19]
Menon et al.

[11] Patent Number: 5,814,208
[45] Date of Patent: *Sep. 29, 1998

[54] HYDROCARBON CATALYTIC CRACKING PROCESS

[76] Inventors: Raghu K. Menon, 124 Bracken Rd., Medford, N.J. 08055; Ramakrishnan Ramachandran, 232 Hillside Ave., Allendale, N.J. 07401

[*] Notice: The term of this patent shall not extend beyond the expiration date of Pat. No. 5,560,817.

[21] Appl. No.: 694,227

[22] Filed: Aug. 8, 1996

Related U.S. Application Data

[63] Continuation of Ser. No. 315,633, Sep. 30, 1994, abandoned.
[51] Int. Cl.$^6$ .................................................. C10G 11/18
[52] U.S. Cl. ...................... 208/113; 208/103; 208/310 R; 208/310 Z; 585/820
[58] Field of Search ................ 208/113, 91, 93, 208/95, 100, 101, 103, 310 R, 310 Z; 585/820, 826, 829, 830

[56] References Cited

U.S. PATENT DOCUMENTS

| | | | |
|---|---|---|---|
| 5,245,099 | 9/1993 | Mitariten | 585/650 |
| 5,560,817 | 10/1996 | Menon et al. | 208/113 |

*Primary Examiner*—Bekir L. Yildirim

[57] ABSTRACT

Hydrocarbon fluid catalytic cracking (FCC) plants are debottlenecked by subjecting part or all of the wet gas stream leaving the main fractionator overhead receiver to pressure swing adsorption to remove methane and hydrogen from this gas stream prior to its introduction into the wet gas compressor. This allows debottlenecking of the compressor system. It can allow the reduction in pressure in the system back to the catalyst regenerator. The reduction in pressure in the catalyst regenerator makes it possible to increase the rate of regeneration of catalyst. Consequently, the rate of hydrocarbon throughput in the FCC plant can be increased.

15 Claims, 1 Drawing Sheet

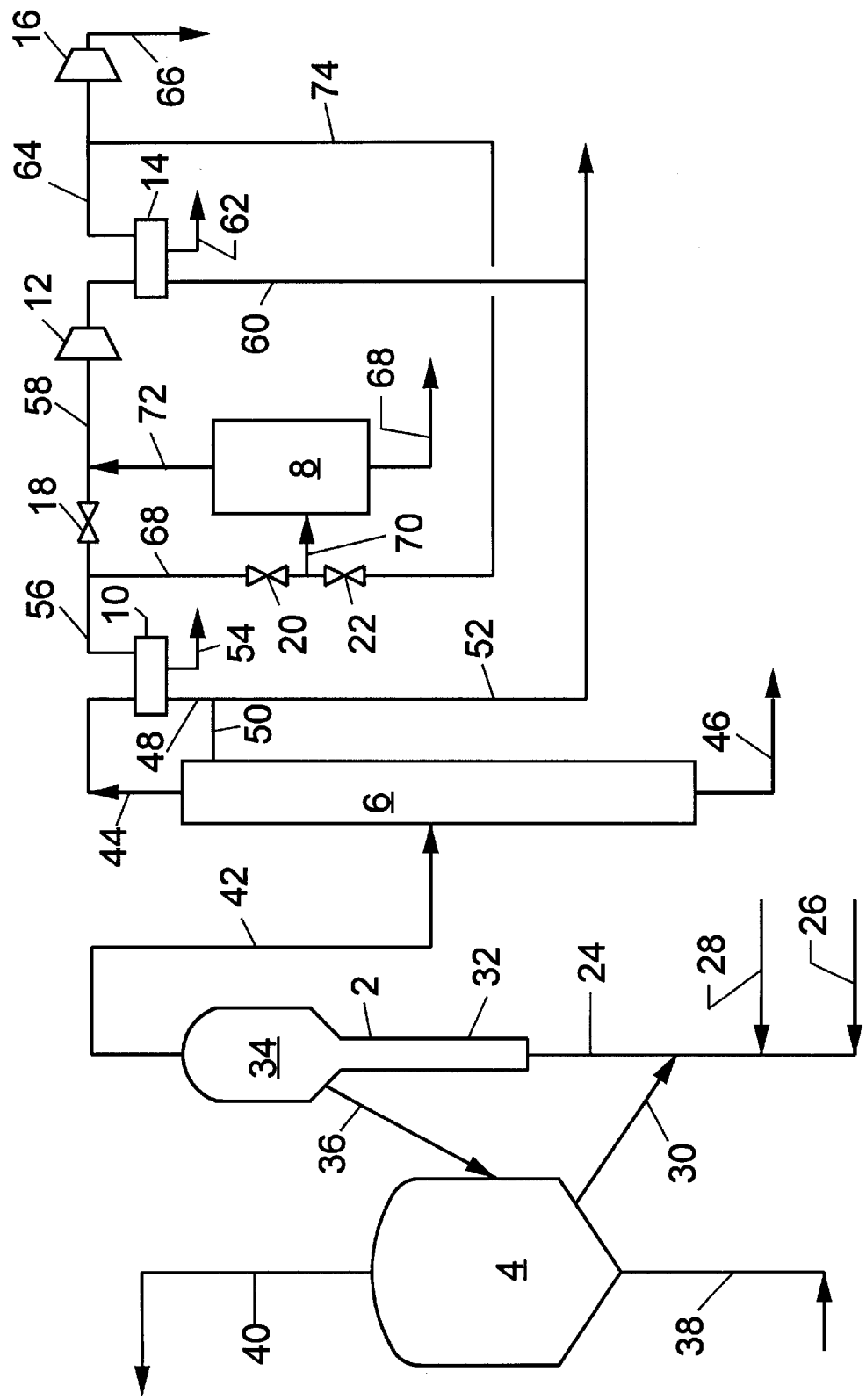
FIGURE 5,814,208

HYDROCARBON CATALYTIC CRACKING PROCESS

This is a continuation of application Ser. No. 08/315,633, filed Sep. 30, 1994, now abandoned.

FIELD OF THE INVENTION

This invention relates to fluid catalytic cracking of hydrocarbons and more particularly to a method of increasing the throughput of hydrocarbon feed in fluid catalytic cracking processes.

BACKGROUND OF THE INVENTION

Refinery cracking processes serve to upgrade the heavier portions of petroleum to large volumes of lighter, more valuable hydrocarbon products. The cracking process is performed catalytically or thermally, the particular method depending on the type of petroleum feedstock being processed. The older thermal cracking processes, which include delayed cokers and flexicokers, is used to process heavy petroleum fractions, while the newer catalytic cracking process, which has developed into one of the most important petroleum refining processes, is used to crack lighter petroleum fractions, such as vacuum gas oil. The dominant catalytic cracking process in use today is the fluid catalytic cracking (FCC) process.

In FCC processes a mixture of hydrocarbon feedstock and steam is injected into a section of a hydrocarbon reactor unit referred to as the riser, where it contacts hot regenerated catalyst. Operating temperatures in the riser-reactor are typically in the range of about 450° to about 575° C. Cracking reactions begin immediately, producing an array of lower boiling hydrocarbons. The catalyst and cracked hydrocarbon vapors are carried up the riser into the catalyst-vapor disengagement section. Hydrocarbon condensation reactions also occur in the riser, with the result that coke is produced and deposited on the active sites of the catalyst. This substantially reduces the catalyst activity and selectivity.

The cracked hydrocarbon vapors and coked catalyst are separated in the reactor disengagement section. The separated catalyst drops by gravity into the stripping section of the unit, where hydrocarbons entrained with the catalyst are separated therefrom by means of stripping steam. The catalyst-free hydrocarbon vapors leave the reactor unit through the cracked product transfer line, and are conveyed to the main column for fractionation.

The cracked hydrocarbons enter the main column, where they are separated into one or more liquid streams and an overhead vapor stream. The overhead vapor stream, which consists of light gasoline and $C_4$ and lighter hydrocarbons, hydrogen and perhaps light inert gases, such as nitrogen, is cooled and discharged into the overhead accumulator vessel, where it undergoes flash separation to yield two hydrocarbon streams: a vapor stream, comprised substantially of $C_4$ and lighter hydrocarbons and hydrogen, and a liquid stream comprised of $C_5$ and heavier hydrocarbons, typically called unstabilized gasoline.

The overhead accumulator vapor stream, typically referred to as wet gas, is subsequently compressed for downstream fractionation steps. The compression is usually conducted in a train of compressors comprising two stages of compression, with interstage condensation and removal of additional unstabilized gasoline. The compressed stream is sent to a high pressure receiver vessel, from which a gaseous stream and a liquid stream are separated. The gaseous stream, referred to as high pressure gas and comprised mostly of $C_2^-$ hydrocarbons and hydrogen, is sent to a series of absorbers and distillation columns for recovery of the various components of this stream. The liquid stream from the high pressure receiver is likewise subjected to downstream processing steps for recovery of its components.

The stripped catalyst from the disengagement section of the cracking reactor flows into the catalyst regenerator. A controlled amount of air is blown into this vessel to rejuvenate the catalyst by combusting the coke on the catalyst, which is maintained in a fluidized state in the regenerator. The coke combustion reactions are highly exothermic; accordingly the catalyst becomes very hot, e.g. its temperature after regeneration is generally in the range of about 560° to about 800° C. Regenerated catalyst is carried out of the regenerator through the regenerated catalyst standpipe and is introduced into the reactor riser, thereby completing the catalyst cycle.

The rate of catalyst flow to the riser is typically controlled by a slide-valve in the regenerated catalyst standpipe. Steady flow of catalyst through this valve is maintained by maintaining a steady residual pressure drop across the valve. For this purpose, it is essential that the regenerator pressure be maintained at pressure higher than the reactor vessel pressure. Thus, the minimum pressure in the catalyst regenerator can be determined by the pressure in the cracking reactor.

The demand for refined hydrocarbon products has increased the incentive to maximize the amount of throughput or conversion in refinery FCC systems. Operation at higher FCC throughput or conversion increases wet-gas production, which in turn, increases production of valuable light hydrocarbons. The ability to increase FCC hydrocarbon throughput or conversion is very often limited by one or more of: (i) wet-gas compression capacity, (ii) regenerator coke burning capacity, and (iii) the ability to circulate catalyst by maintenance of required pressure drop across critical elements of the system.

Wet-gas compressor throughput can be enhanced by operating with a higher compressor inlet suction pressure, which can be attained by increasing the overhead accumulator pressure. For instance, increasing the overhead accumulator pressure by 1 psi can increase wet-gas compressor capacity by up to about 4%. However, the pressure in the overhead accumulator controls the upstream pressure, i.e. the pressure in the main column and the hydrocarbon riser-reactor. Increasing the overhead accumulator pressure would cause an increase in riser-reactor pressure, which is undesirable from a cracking perspective, because higher cracking reaction pressures enhance the selectivity of the coke-forming condensation reaction at the expense of the desirable cracking reactions. Furthermore, the riser-reactor can encounter a catalyst circulation limit and flow reversal, unless the catalyst regenerator pressure is also correspondingly increased. Increasing the regenerator pressure is undesirable because this increases the air blower discharge pressure, which reduces its output.

Wet-gas compressor throughput can also be increased by lowering the compressor discharge pressure. This is likewise undesirable because the corresponding lower deethanizer-absorber pressure causes propylene to be lost to fuel gas. Quantitatively, lowering the absorber pressure by 20 psi could increase gas compressor throughput by 5%, but it also results in a 1.5% reduction in propylene recovery.

In addition to increasing wet-gas production, operation at higher throughput or conversion increases coke production rate, which tends to push units to their limiting ability to regenerate spent catalyst. The actual limit can be due to the limiting amount of air which the air blower can discharge. Some relief from an air-blower limit may be obtained by lowering the regenerator pressure, which enables the blower to discharge more moles of oxygen (in the form of air or oxygen plus inert diluent). The increased amount of oxygen availability allows the combustion of a larger amount of coke, which also releases more heat energy in the regenerator. The increased heat release and coke burning capacity can be taken advantage of by increasing the feed rate to the riser-reactor, and allowing the unit to establish a different heat and coke balance. However, lowering the regenerator pressure at constant riser pressure, could also lead to a catalyst circulation limit and flow reversal. A catalyst circulation limit may also be directly encountered due to the higher catalyst circulation rate required to process higher throughput at constant conversion. From the above discussion, it is clear that the major constraints on an FCC unit are all strongly interrelated, and operational moves made to obtain relief from any one constraint may push the unit towards another constraint.

The load on the wet-gas compressor system would be considerably lessened if the light components could be removed from the wet-gas. This would permit a reduction in overhead accumulator pressure, which would, in turn, increase hydrocarbon throughput and conversion in the cracking reactor. This invention provides a means of achieving this, and also enables the operator to make operational moves that would debottleneck other constraints on the unit.

SUMMARY OF THE INVENTION

According to the invention, the volume of wet gas that must be handled by the wet gas compressors is reduced by diverting all or a portion of the compressor feed gas to an adsorption system comprised of one or more adsorption beds containing adsorbent(s) that adsorb $C_2$ and higher hydrocarbons more strongly than they adsorb methane and hydrogen. Methane and hydrogen, and any other light inert gases that are present in the wet gas, such as nitrogen and argon, pass through the adsorption beds as nonadsorbed component, and are sent to refinery fuel, or otherwise disposed of. The adsorbed gas component, enriched in hydrocarbons heavier than methane, i.e. having molecular weights greater than that of methane, is desorbed from the adsorbent and sent to the wet gas compressors, where it is compressed and sent to downstream hydrocarbon separation units.

In each of the embodiments discussed below a main column overhead stream is produced by the following steps. A hydrocarbon feedstock, such as vacuum gas oil, is cracked in the hydrocarbon cracking zone of a fluid catalytic cracking system in the presence of hot regenerated hydrocarbon cracking catalyst, and a cracked hydrocarbon product stream and coke-coated catalyst are removed from the cracking zone. Coke-coated catalyst is then transported from the cracking zone to the catalyst regeneration zone, and regenerated therein by burning coke from the catalyst in the presence of an oxygen-inert gas mixture. The regenerated catalyst is then returned to said hydrocarbon cracking zone. The cracked hydrocarbon product is then distilled in the main column, thereby producing an overhead gas stream and one or more liquid streams. The overhead stream gas stream is discharged into the overhead accumulator where it separates into a liquid phase and a vapor phase. The liquid phase, comprising unstable gasoline, is removed. The vapor phase is the wet gas stream.

According to a first embodiment of the invention, the entire wet gas stream is sent to an adsorption system for removal of methane and hydrogen. The adsorption system may include a first, i.e. preliminary, adsorption bed which adsorbs $C_5$ and heavier hydrocarbons from the wet gas stream and a second, i.e. main, adsorption bed which adsorbs $C_2$ and higher hydrocarbons from the wet gas. As the wet gas stream passes through the preliminary bed $C_5$ and higher hydrocarbons are removed from the stream. The nonadsorbed gas from the preliminary adsorption bed then passes through the main adsorption bed wherein $C_2$ and heavier hydrocarbons are adsorbed. Methane and hydrogen pass through the adsorption system as nonadsorbed gas and sent to refinery gas, or otherwise disposed of. The $C_5$ and heavier adsorbed component is desorbed from the preliminary bed and combined with other unstable gasoline streams from the plant The methane- and hydrogen-depleted wet gas is desorbed from the main bed and sent to the wet gas compressors. and the compressed gas is transported to downstream hydrocarbon processing units for further separation of its components.

According to a second embodiment, part of the wet gas stream from the overhead accumulator is sent to the above-described adsorption system and the remainder, or bypass wet gas stream, is sent to the compressors. After separation of the light components, the desorbed component stream is combined with the bypass wet gas stream, and the mixture is sent to the compressors.

In a third embodiment, all of the wet gas stream is sent to the first stage compressor and then to a receiver, wherein additional unstable gasoline is removed. Part of the remaining wet gas stream can be further compressed and is sent to further downstream processing units, and the remainder is sent to the above-described adsorption system for removal of light components. The desorbed component is recycled to the feed to the first compressor.

In a fourth embodiment, part of the wet gas stream is compressed in a first stage wet gas compressor and additional liquid $C_5$ hydrocarbon-containing component is removed therefrom. Part of the compressed and further $C_5$ hydrocarbon-depleted wet gas stream can be further compressed and is sent to downstream processing units, and the remainder is combined with wet gas stream that was not subjected to wet gas compression and further liquid $C_5$ hydrocarbon removal, and the combined stream is subjected to the above-described adsorption process. The desorbed stream, containing hydrocarbons higher than methane, is recycled to the first wet gas compressor.

In a preferred embodiment the compression of step (g) is carried out in two stages. In another preferred embodiment, the wet gas used as feed for the adsorption step is taken from a point intermediate the first and second compression stages.

In another preferred embodiment, the oxygen-containing gas mixture used in the catalyst regeneration step is air, an oxygen-nitrogen mixture. an oxygen-carbon dioxide mixture or air-oxygen-carbon dioxide mixture.

In other preferred embodiments the adsorption step of the pressure swing adsorption process is carried out at an absolute pressure in the range of about 2 to about 5 bar, and the adsorbent regeneration step of the pressure swing adsorption process is carried out at an absolute pressure in the range of about 200 to about 2000 torr.

In another preferred embodiment the adsorbent used in the preliminary adsorption step is a medium or large pore zeolite, such as dealuminated type Y zeolite, and that used in the main adsorption step is selected from silica gel, activated carbon, activated alumina, zeolite molecular sieves and mixtures of these.

In another preferred embodiment, the hydrocarbon feedstock to the cracking reactor is vacuum gas oil.

BRIEF DESCRIPTION OF THE DRAWINGS

The drawing FIGURE is a schematic illustration of a hydrocarbon FCC plant comprising a hydrocarbon cracking reactor, a cracking catalyst regenerator, and a part of cracked catalyst recovery system, and depicting preferred embodiments of the invention.

DETAILED DESCRIPTION OF THE INVENTION

The present invention can be used with advantage in any hydrocarbon cracking process in which a hydrocarbon is cracked in a reactor by means of a fluidized particulate catalyst and the catalyst is subsequently transferred in the fluidized state to a regenerator for combustive removal of coke deposited on the catalyst during the cracking reaction. Included in such processes are conventional FCC operations, fluid coking and flexicoking processes which use coke particles as the catalyst. For the sake of simplicity, however, the invention will be described in detail as it applies to an FCC process.

The appended FIGURE illustrates a typical FCC system equipped to handle each of the above-discussed embodiments of the invention. The system illustrated in the FIGURE includes, as principal units, an FCC riser reactor, 2, a cracking catalyst regenerator, 4, a main hydrocarbon fractionator, 6, an adsorption system, 8, a main fractionator overhead accumulator, 10, a first stage compressor, 12, an intermediate pressure gas receiver, 14, and a second stage compressor, 16. Various pipelines and valves have been included in the FIGURE as an aid to the explanation of the several aspects of the invention. Hydrocarbon processing and separation equipment and associated processing equipment, heat exchangers, valves, gages, etc., that are not directly related to the invention or which are not necessary for an understanding of the invention have been omitted from the FIGURE for the sake of simplicity.

In the conventional operation of the system illustrated in the FIGURE, valve 18 is open and valves 20 and 22 are closed. A hydrocarbon feed stream, such as vacuum gas oil, and steam are introduced into reactor 2 feed line 24 via lines 26 and 28, respectively. As the mixture passes upwardly in line 24 it mixes with hot regenerated cracking catalyst, which enters line 24 through regenerated catalyst transport line 30. The catalyst is fluidized by the rising hydrocarbon and steam vapors and the fluidized mixture enters the bottom of the riser section 32 of reactor 2. The hydrocarbon rapidly cracks into lighter hydrocarbons as it moves upwardly through riser 32. During the course of the cracking reaction the catalyst becomes coated with coke, as a result of hydrocarbon condensation reactions that accompany cracking of the hydrocarbon. The cracked hydrocarbon-catalyst mixture enters disengagement section 34 of reactor 2 and passes through a battery of cyclone separators (not shown) where residual catalyst is separated from the gas mixture. Subsequently, residual hydrocarbon entrained with the catalyst is removed by steam stripping. Spent catalyst passes out of reactor 2 through spent catalyst transport line 36 and flows to regenerator 4.

In regenerator 4, the hot coked catalyst contacts a stream of air (or a mixture of oxygen and an inert gas, such as carbon dioxide), introduced into regenerator 4 through line 38. The coke immediately ignites and burns. The combustion can be conducted in the presence of excess oxygen, which results in the conversion of substantially all of the carbon in the coke to carbon dioxide, or it can be conducted in the presence of a stoichiometric deficit of oxygen, which results in the production of carbon monoxide and carbon dioxide. Regenerated catalyst flows through regenerated catalyst transport line 30 to complete the catalyst cycle. The hot exhaust gases rise to the top of regenerator 4 and pass out of the regenerator through exhaust gas line 40. The exhaust gases are subsequently processed to combust carbon monoxide in the gas and to recover heat.

The cracked hydrocarbon gas passes out of reactor 2 through product line 42 and is transported to main fractionator 6. As the hydrocarbon reactor effluent passes through fractionator 6, the more volatile components separate from the less volatile components, the lighter, lower-boiling components rising towards the top of the column, and the heavier, higher-boiling components descending towards the bottom of the column. At the top of the column a vapor stream comprised primarily of $C_5$ and lighter components is removed from the column 6 through overhead vapor line 44, and at the bottom of the column a heavy hydrocarbon stream is removed from the column through line 46. The bottoms product can be recycled as feed to reactor 2, or it may be sent to downstream units for further processing. Several intermediate side streams are also typically withdrawn from column 6, but these have no bearing on the invention, and thus are not shown in the FIGURE.

The overhead stream from column 6 is cooled and passed into overhead accumulator 10, where liquid and vapor components separate. Unstable gasoline is removed from the bottom of accumulator 10 as a liquid through line 48. A portion of this stream is recycled to column 6 as reflux through reflux line 50, and the remainder is sent to downstream processing units via line 52 for further product recovery. A liquid sour water stream is removed from accumulator 10 through drain line 54.

A wet-gas stream comprised generally of $C_4$ and lighter components, but still containing small quantities of $C_5$ and heavier components, leaves accumulator 10 through line 56, passes through valve 18 and compressor feed line 58 and enter first stage wet-gas compressor 12. The wet-gas compressor system is illustrated as comprising a pair of serially connected units, but it can be configured in other arrangements, such as parallel-series combinations. As the wet-gas undergoes compression, additional gasoline component and sour water are condensed. The first stage compressor liquid-gas effluent is sent to intermediate pressure receiver 14, from which gasoline and sour water are removed through lines 60 and 62, respectively. The interstage gasoline condensate is combined with the gasoline in line 52 and likewise sent to downstream processing units for further product separation. An intermediate pressure gas stream exits receiver 14 through line 64 and is subjected to further compression in second stage compressor 16. This gas stream, now comprised primarily of $C_4$ and lighter components, is sent to downstream units via line 66 for further separation of the various alkene and alkane components contained in this stream.

The benefits of the invention result from the inclusion of adsorption plant 8 in the system. Adsorption plant 8 may comprise a single adsorber or a battery of adsorbers arranged in parallel and/or in series. In preferred embodiments, the system comprises two or more adsorbers arranged in parallel and cycled out of phase to provide a pseudo-continuous flow of nonadsorbed and desorbed gas streams.

The separator may optionally comprise multiple stages. A preliminary adsorptive separation stage may be used to reduce the $C_5$ and heavier component stream content to desirable levels. A large pore size zeolite, such as dealuminated type Y zeolite, may be used as the adsorbent in the preliminary adsorption step. The second, or primary adsorptive step is described below. The separated $C_5$ and heavier fraction is combined with the other $C_5$ streams removed from the system.

The adsorption system is operated in a pressure swing adsorption (PSA) mode. Pressure swing adsorption is well known for separating the components of a mixture of gases by virtue of the difference in the degree of adsorption among them on a particulate adsorbent retained in a stationary bed. Typically, two or more such beds are operated in a cyclic process comprising adsorption under relatively high pressure and desorption or bed regeneration under relatively low pressure or vacuum. The cycle may contain steps other than the fundamental steps of adsorption and regeneration. For example, the cycle may include one or more bed pressure equalization steps, in which some of the gas contained in a first adsorption vessel which has just completed its adsorption step is transferred to second adsorption vessel which has just completed its bed regeneration step. In this way the high pressure gas in the first vessel is used to partially pressurize the second bed, thus enhancing the efficiency of the process. The cycle may also include a product backfill step wherein the regenerated bed is partially pressurized, before or in lieu of the bed equalization step, by introducing nonadsorbed product gas into the bed in the countercurrent direction, i.e. in the direction opposite to the direction that fresh feed in passed through the bed. The design and operation of PSA units is well known and details concerning such forms no part of the invention.

The adsorption can be carried out using any adsorbent or mixture of adsorbents that selectively adsorbs $C_2$ and higher hydrocarbons from a gas mixture containing these hydrocarbons, methane, and hydrogen, and possibly also containing light permanent gases, such as nitrogen and argon. Suitable adsorbents include molecular sieves, activated carbons, activated clays, silica gels, activated aluminas, etc. Molecular sieves include aluminophosphates, silicoaluminophosphates, and zeolites. Typical zeolites include natural zeolites, such as chabazite, clinoptilolite, erionite, faujasite, mordenite, etc., and synthetic zeolites, such as type X zeolites, type A zeolites, and type Y zeolites. Preferred adsorbents include silica gel, activated carbon, activated alumina, zeolite molecular sieves and mixtures of these.

When the adsorbent is a molecular sieve, it is often desirable to combine it with a binder. Any natural or synthetic binder material or mixture of materials can be used as binder for the adsorbent. Typical binders include metal oxides, clays, silicas, aluminas, etc. Suitable clay binders include kaolin, bentonite, montmorillonite, attapulgite, etc. The choice of binder and methods of agglomerating the adsorbent and binder are well known to those skilled in the art and form no part of the invention.

The adsorption process is generally carried out at temperatures in the range of about 0° to about 200° C., and preferably at temperatures in the range of about 15° to about 150° C. The adsorption step of the cycle is usually carried out at absolute pressures in the range of about 1 to about 10 bar, and is preferably carried out at absolute pressures in the range of about 2 to about 5 bar.

The adsorbent regeneration step of the cycle is generally carried out at an absolute pressure of about 200 to about 3000 torr, and is preferably carried out at an absolute pressure in the range of about 200 to about 2000 torr. The adsorbent can be regenerated by a number of techniques. In one procedure, the adsorbent is regenerated by venting the bed back to the compressor feed line until the pressure in the bed reaches about atmospheric pressure. If desired, the adsorbent can be further regenerated by evacuation using a vacuum means, such as a vacuum pump or an ejector. By this means the pressure in the bed can be reduced to 200 mm absolute, or lower. The adsorbent can also be purged with a gas, such as the nonadsorbed fraction. Combinations of venting, vacuum evacuation and purging can also be used for adsorbent regeneration. If it is desired to maximize the amount of hydrocarbon recovered in each cycle, all three of these recovery procedures can be used.

In the practice of the first embodiment of the invention, valves 18 and 22 are closed and valve 20 is opened. Wet-gas is now diverted to adsorption system 8 through line 68, valve 20 and adsorption system feed line 70. The wet-gas approaching adsorption system 8 may contain a considerable amount of moisture. Since moisture is usually rapidly adsorbed by most adsorbents, it is preferable to dry the gas prior to admitting it to the adsorption beds. This can be accomplished by passing the gas through a desiccant, such as silica gel or alumina. Even though the desiccant may also adsorb some of the hydrocarbon in the wet-gas feed, water will be more strongly adsorbed by the adsorbent; hence the adsorbed hydrocarbon will be displaced by the moisture entering the desiccant.

As the wet-gas passes through the adsorbent beds contained in the adsorption vessels of system 8, $C_2$ and higher hydrocarbons will be adsorbed, and methane and hydrogen will pass through the beds and exit system 8 through line 68 as nonadsorbed product. The nonadsorbed gas stream is then sent to refinery fuel, or is otherwise disposed of. When the adsorbed component reaches the desired endpoint in the adsorption vessel the adsorption step is terminated and the adsorbent is regenerated to recover the adsorbed gas fraction. The desorbed gas leaves adsorption system through line 72 and is returned to first stage compressor feed line 58.

The procedure of the first embodiment enables compressors 12 and 16 to handle additional amounts of hydrocarbon, since the volume of the wet gas has been significantly reduced by removal of considerable amounts of methane and hydrogen from this stream. The increased molecular weight of the stream also enables ease of compression. This procedure may also be used to reduce the pressure in the system upstream of adsorption system 8, if the adsorption system is designed to remove wet gas from line 68 quickly enough to cause a pressure reduction in this line.

In the second embodiment of the invention, valves 18 and 20 are open, and valve 22 is closed. This embodiment is similar to the first embodiment, except that the system has the additional advantage that the reduced pressure in line 58 which results from the passage of part of the wet-gas through adsorption system 8 can be reflected all the way back to catalyst regenerator 4. In this embodiment, flow through lines 58 and 68 is adjusted to the desired rates by regulation of the openings in valves 18 and 20.

In the third embodiment, valves 18 and 22 are open and valve 20 is closed. In this case, all of the wet gas in line 56 passes through first stage compressor 12 and intermediate pressure gas from line 64 passes through line 74 and valve 22 and into adsorption system 8, and desorbed gas is returned to first stage compressor 12 feed line 58 via line 72. The advantage of this embodiment is that the gas stream in line 64 is substantially free of water; accordingly it is not necessary to include a desiccant bed in adsorption system 8. This gas stream is also substantially free of $C_5$ and heavier components. This embodiment also increases the throughput of compressor 1 2 by reducing the pressure on the discharge side of this compressor, and results in a reduction of pressure in the upstream units because valve 18 is open. Depending on the extent that valve 22 is opened, the load to be handled by compressor 16 may be reduced. The molecular weight of the gas handled by both compressors is also increased by this option because the lightest components are rejected from the system through line 68.

In a fourth embodiment of the invention, valves 18, 20 and 22 are open. In this case part of the wet-gas in line 56 passes through adsorption system 8 by virtue of open valve 20. Additionally, part of the intermediate pressure gas stream in line 60 passes through adsorption system 8 through open valve 22. This embodiment has the advantage that the feed pressure to both compressors 12 and 16 is reduced since some methane and hydrogen are removed from the wet-gas before it reaches compressor 12, and the remainder is removed from intermediate pressure gas line 64. This embodiment also enjoys the advantage that since the pressure in line 58 is reduced and valve 18 is open, the pressure throughout the system upstream of compressor 12, including the pressure in regenerator 4, will be reduced.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis. The example illustrates the process of the invention as it applies to the catalytic cracking of a gas oil.

EXAMPLE

This example is simulated for operation in the practice of the first embodiment described above, i.e. where the entire wet gas stream is processed in a PSA system prior to being compressed in the wet gas compressors. The flow rates of the streams of interest are listed in the Table, using a basis a feed stream of 100 MMSCF/D, the composition of which is likewise set forth in the Table. All flow rates are expressed in MMSCF/D (million standard cubic feed per day)

The separator in this hypothetical example consists of two stages. The $C_5$ and heavier hydrocarbons are removed in a first stage adsorption plant by pressure swing adsorption using a bed containing de-aluminated zeolite Y catalyst. The nonadsorbed pressure product from the first stage plant is then sent to a second stage adsorption plant that contains silica-gel. The pressure during the adsorption step of the first and second stages is projected to be 17.5 and 16 psig, respectively, and during the vacuum regeneration step of each of the first and second stages is projected to be 400 millibar. The sorbate from the second stage is sent to the first-stage of a wet-gas compression plant, after its pressure and temperature have been appropriately adjusted.

TABLE

| Component | Gas to Separator | Gas to Compressor | Reject Gas |
|---|---|---|---|
| Hydrogen | 17.0 | 2.5 | 14.5 |
| Methane | 21.0 | 3.2 | 17.8 |
| Carbon Monoxide | 0.5 | 0.1 | 0.4 |
| Carbon Dioxide | 1.5 | 1.3 | 0.2 |

TABLE-continued

| Component | Gas to Separator | Gas to Compressor | Reject Gas |
|---|---|---|---|
| Nitrogen | 5.0 | 0.8 | 4.2 |
| Hydrogen Sulfide | 0.4 | 0.35 | 0.05 |
| Ethylene | 7.0 | 6.0 | 1.0 |
| Ethane | 6.0 | 5.2 | 0.8 |
| Propylene | 12.0 | 11.0 | 1.0 |
| Propane | 3.5 | 3.2 | 0.3 |
| Butylenes | 11.0 | 10.0 | 1.0 |
| Normal Butane | 2.0 | 1.8 | 0.2 |
| Isobutane | 5.0 | 4.5 | 0.5 |
| $C_5+$ | 8.1 | 1.2 | 6.9 |
| TOTAL | 100 | 51.15 | 48.85 |
| AVG. MOLECULAR WT. | 32.3 | 40.8 | 23.4 |

As can be seen from the table, the amount of gas to be compressed is significantly reduced, from 100 to about 51 MMSCF/D. An advantage of the invention, as illustrated in the table, is the higher molecular weight of the product gas for compression. If a higher recovery level of the $C_2$ and heavier hydrocarbons is desired, the nonadsorbed gas is subjected to further adsorptive separation stages.

Although the invention has been described with particular reference to a specific experiment, this experiment is merely exemplary of the invention and variations are contemplated. For example, the process of the invention may be practiced in equipment arrangements other than those illustrated in the drawings. The scope of the invention is limited only by the breadth of the appended claims.

What is claimed is:

1. In a process for producing and recovering cracked hydrocarbons from a hydrocarbon feedstock in a hydrocarbon fluid catalytic cracking system comprising a hydrocarbon cracking zone, a catalyst regeneration zone and a cracked hydrocarbon distillation zone comprising the steps:

(a) cracking said hydrocarbon feedstock in said hydrocarbon cracking zone in the presence of hot regenerated hydrocarbon cracking catalyst, and removing a cracked hydrocarbon product stream and coke-coated catalyst from said cracking zone;

(b) transporting said coke-coated catalyst to said catalyst regeneration zone and regenerating said catalyst therein by burning coke from the catalyst in the presence of an oxygen-inert gas mixture, and returning regenerated catalyst to said hydrocarbon cracking zone;

(c) distilling said cracked hydrocarbon product in said cracked hydrocarbon distillation zone, thereby producing an overhead gas stream and one or more liquid streams;

(d) cooling said overhead gas stream, thereby separating said gas stream into a liquid stream containing $C_5$ and heavier hydrocarbons and a wet gas stream comprised of $C_4$ and lighter hydrocarbons and hydrogen; and (e) compressing said wet gas stream in a wet gas compressor; the improvement comprising enhancing the rate of conversion of hydrocarbon to cracked hydrocarbon product by, prior to step (e), (f) subjecting at least part of said wet gas stream to a pressure swing adsorption process in an adsorption zone containing an adsorbent which preferentially adsorbs $C_2$ and, higher hydrocarbons from said wet gas, thereby producing a nonadsorbed gas fraction comprised of methane and hydrogen and a desorbed gas fraction comprised of $C_2$ and higher hydrocarbons; and (g) transporting at least part of said desorbed gas fraction to said wet gas compressor;

thereby reducing the pressure throughout said fluid catalytic cracking system and consequently increasing the flow of oxygen-containing gas to said catalyst regeneration zone and enhancing the extent of catalyst regeneration.

2. The process of claim 1, wherein substantially all of said wet gas stream is subjected to said pressure swing adsorption process prior to step (e).

3. The process of claim 1, wherein part of said wet gas stream is subjected to said pressure swing adsorption process, and part is combined with said desorbed gas fraction prior to step (e).

4. The process of claim 1, wherein the compression of step (e) is carried out in two stages.

5. The process of claim 4, wherein at least part of the wet gas used in step (f) is taken from a point intermediate the first and second compression stages.

6. The process of claim 1, wherein at least part of said wet gas stream is compressed in a wet gas compressor and additional liquid $C_5$ hydrocarbon is removed therefrom, and part of the compressed and further $C_5$ hydrocarbon-depleted stream is subjected to steps (f) and (g).

7. The process of claim 1, wherein part of said wet gas stream is compressed in a wet gas compressor and additional liquid $C_5$ hydrocarbon-containing component is removed therefrom, and part of the compressed and further $C_5$ hydrocarbon-depleted stream is combined with wet gas stream that was not subjected to wet gas compression and further liquid $C_5$ hydrocarbon removal, and the combined stream is subjected to steps (f) and (g).

8. The process of claim 1, wherein said oxygen-inert gas mixture is air, an oxygen-nitrogen mixture, an oxygen-carbon dioxide mixture or air-oxygen-carbon dioxide mixture.

9. The process of claim 1, wherein the adsorption step of said pressure swing adsorption process is carried out at an absolute pressure in the range of about 2 to about 5 bar.

10. The process of claim 1, wherein the adsorbent regeneration step of said pressure swing adsorption process is carried out at an absolute pressure in the range of about 200 to about 2000 torr.

11. The process of claim 1, wherein the adsorbent used in step (e) is selected from silica gel, activated carbon, activated alumina, zeolite molecular sieves and mixtures of these.

12. The process of claim 1, wherein said hydrocarbon feedstock is vacuum gas oil.

13. The process of claim 1, wherein prior to step (f) $C_5$ and heavier components are removed from the wet gas stream by a preliminary pressure swing adsorption step.

14. The process of claim 13, wherein the adsorbent used in said preliminary pressure swing adsorption step is a medium or large pore zeolite.

15. The process of claim 14, wherein the adsorbent used in said preliminary pressure swing adsorption step is dealuminated Y zeolite.

\* \* \* \* \*